(12) United States Patent
Smyth et al.

(10) Patent No.: US 10,176,396 B2
(45) Date of Patent: Jan. 8, 2019

(54) SYSTEMS AND METHODS FOR COMPUTING AND PRESENTING RESULTS OF VISUAL ATTENTION MODELING

(71) Applicant: 3M INNOVATIVE PROPERTIES COMPANY, St. Paul, MN (US)

(72) Inventors: William K. Smyth, Stillwater, MN (US); Richard J. Moore, Maplewood, MN (US); Benjamin D. Zimmer, Maplewood, MN (US); Brian J. Stankiewicz, Mahtomedi, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/896,701

(22) PCT Filed: Jun. 2, 2014

(86) PCT No.: PCT/US2014/040440
§ 371 (c)(1),
(2) Date: Dec. 8, 2015

(87) PCT Pub. No.: WO2014/200742
PCT Pub. Date: Dec. 18, 2014

(65) Prior Publication Data
US 2016/0132749 A1    May 12, 2016

Related U.S. Application Data

(60) Provisional application No. 61/834,271, filed on Jun. 12, 2013.

(51) Int. Cl.
*G06K 9/46* (2006.01)
*G06K 9/32* (2006.01)
(Continued)

(52) U.S. Cl.
CPC ......... *G06K 9/4652* (2013.01); *G06K 9/3233* (2013.01); *G06K 9/52* (2013.01); *G06T 7/90* (2017.01); *G06K 2009/4666* (2013.01)

(58) Field of Classification Search
CPC .. G06K 9/3233; G06K 9/3241; G06K 9/4652; G06K 2009/4666; G06K 9/52; G06T 7/90
See application file for complete search history.

(56) References Cited

U.S. PATENT DOCUMENTS 6,320,976 B1    11/2001 Murthy
7,940,985 B2 *   5/2011 Sun ..................... G06K 9/3233
                                                382/155

(Continued)

FOREIGN PATENT DOCUMENTS

JP    2013-012124    1/2013

OTHER PUBLICATIONS

Gao, "On the plausibility of the discriminant center-surround hypothesis for visual saliency", Journal of Vision, 2008, vol. 8, No. 7, pp. 1-18.

(Continued)

*Primary Examiner* — Yon Couso
(74) *Attorney, Agent, or Firm* — Daniel J. Iden

(57) ABSTRACT

At least some embodiments of the present disclosure feature systems and methods for assessing the impact of visual features within a region of a scene. With the input of a visual representation of a scene and at least one selected region within the scene, the system applies a visual attention model to the visual representation to determine visual conspicuity of the at least one selected region. The system computes feature-related data associated with a plurality of features of the at least one selected region. Based on the visual conspicuity and the feature-related data, the system assesses an (Continued)

impact that at least one of the features within the at least one selected region have on the visual conspicuity.

22 Claims, 6 Drawing Sheets

(51) Int. Cl.
*G06K 9/52* (2006.01)
*G06T 7/90* (2017.01)

(56) References Cited

U.S. PATENT DOCUMENTS

| | | | |
|---|---|---|---|
| 8,363,939 | B1 | 1/2013 | Khosla |
| 8,369,652 | B1 | 2/2013 | Khosla |
| 8,416,992 | B2 * | 4/2013 | Le Meur ............ G06K 9/4623 382/107 |
| 8,649,606 | B2 * | 2/2014 | Zhao .................... G06K 9/4671 382/159 |
| 8,687,844 | B2 * | 4/2014 | Choe .................... G06K 9/3233 382/103 |
| 9,025,880 | B2 * | 5/2015 | Perazzi ................ H04N 19/117 382/190 |
| 9,298,980 | B1 * | 3/2016 | Yuan .................. G06K 9/00456 |
| 9,483,702 | B2 * | 11/2016 | Fredembach ............ G06K 9/46 |
| 2004/0120574 | A1 | 6/2004 | Rosenholtz |
| 2006/0070026 | A1 | 3/2006 | Balinsky |
| 2010/0086278 | A1 | 4/2010 | Stankiewicz |
| 2013/0158963 | A1 | 6/2013 | Brooks |

OTHER PUBLICATIONS

Itti, "A saliency-based search mechanism for overt and covert shifts of visual attention", Vision Research, 2000, vol. 40, pp. 1489-1506.
Rosenholtz, "Do predictions of visual perception aid design?", ACM Transactions on Applied Perception, 2011, vol. 8, No. 2, pp. 12.1-12.20.
International Search Report for PCT International Application No. PCT/US2014/40440, dated Oct. 17, 2014, 2pgs.
EP Search Report, EP 14810266, dated Feb. 1, 2017 (10 pages).
Itti Let al: "A model of Saliency-based Visual attention for rapid scene analysis", IEEE Transactions on Pattern Analysis and Machine Intelligence, IEEE Computer Society, USA, vo l . 20, No. 11 ,Nov. 1, 1998 (Nov. 1, 1998), pp. 1254-1259, XP002753706, ISSN: 0162-8828, DOI: 10.1109/34.730558.
Youngmin Kim et al: "Saliency-guided Enhancement for Volume Visualization", IEEE Transactions on Visualization and Computer Graphics, IEEE Service Center, Los Alamitos, CA, US, vol. 12, No. 5, Sep. 1, 2006 (Sep. 1, 2006), pp. 925-932, XP011150893, ISSN: 1077-2626, DOI: 10.1109/TVCG.2006.174.
H. Janicke et al: "A Salience-based Quality Metric for Visualization", Computer Graphics Forum, vol. 29, No. 3, Jun. 1, 2010 (Jun. 1, 2010), pp. 1183-1192, XP055340345, GB ISSN: 0167-7055, DOI: 10.1111jj.1467-8659.2009.01667.x.
Yafeng Zheng et al: 11 Salient Region Detection Based on Automatic Feature Selection 11, Intelligent Information Technology Application, 2009. IITA 2009. Third International Symposium on, IEEE, Piscataway, NJ, USA, Nov. 21, 2009 (Nov. 21, 2009), pp. 232-235, XP031592913, ISBN: 978-0-7695-3859-4.
Lai-Kuan Wong et al: "Saliency retargeting: An approach to enhance image aesthetics", Jan. 5, 2011, XP031913556 (8 pages).
Deville Benoit et al: "See ColOr: Seeing Colours with an Orchestra", ResearchGate, Jan. 2009, XP047393245 (30 pages).
Lori Mccay-Peet et al: "On saliency, affect and focused attention", Jan. 1, 2012, XP055465694 (10 pages).
Takayanagi Yohei, Ozasa Yuko, Enami Naoko, Ariki Yasuo, A Model of Dynamic Saliency for Human Detection, IEICE Technical Report, Japan, Institute of Electronics, Information and Communication Engineers, Jan. 16, 2013, vol. 112, Issue 386, p. 187-191.
Ishitobi Jiro, Yuenshuyan Koh, Maeda Junji, Automatic Detection of Major Objects in an Image Based on Visual Attention Model, IEICE Technical Report, Japan, Institute of Electronics, Information and Communication Engineers, Feb. 11, 2013 vol. 112, Issue 433, p. 83-88.
Umeda Shuichi, Komine Kazuteru, Morita Toshiya, Fusion parameter extraction of saliency map from the saccadic latency in a visual search task, Proceedings of the ITE Annual Convention [CD-ROM], Japan, The Institute of Image Information and Television Engineers, Aug. 2, 2010.

* cited by examiner

US 10,176,396 B2

SYSTEMS AND METHODS FOR COMPUTING AND PRESENTING RESULTS OF VISUAL ATTENTION MODELING

TECHNICAL FIELD

The present disclosure relates to applying visual attention modeling to visual representations and how to present results of the modeling.

BACKGROUND

A biological visual system is a capacity limited system in that it can only process a relatively small number of objects at any given time. This is true, despite the fact that there are many objects that may be visible at any given time. From the array of objects visible to a person, that person's visual system will only attend to, or process, one (or a few) objects at any given time. In addition, people can attend to an object while looking at it, which is overt attention, and people can attend to an object without looking at it in their peripheral vision, which is covert attention.

Understanding what attracts visual attention is a topic of research in psychology, neuroscience and computer science. This research has generated numerous studies directed toward understanding the behavior of human visual attention, as well as many computational models of visual attention. These computational models (sometimes called visual attention models, eye-gaze prediction models, attention models, or saliency models) attempt to simulate where, given visual stimuli (for example, a picture or a scene), a person will allocate his visual attention.

SUMMARY

At least some embodiments of the present disclosure feature a method for assessing the impact of visual features within a region of a scene with a computer having a processor and memory. The method includes the steps of: receiving a visual representation of a scene; receiving region selection data indicative of at least one selected region within the scene; applying, using the processor, a visual attention model to the visual representation to determine the visual conspicuity of the at least one selected region; computing, using the processor, feature-related data associated with a plurality of features associated with the at least one selected region; based on the visual conspicuity and the feature-related data, assessing an impact that at least one of the features within the at least one selected region have on the visual conspicuity.

At least some embodiments of the present disclosure feature a system for presenting visual attention model (VAM) results. The system includes an input module configured to receive a visual representation of a scene and region selection data indicative of a selected region within the scene, a VAM module configured to apply a visual attention model on the visual representation to determine the visual conspicuity of the selected region, an output module configured to estimate a contribution of the visual feature to the visual conspicuity of the selected region based on the visual conspicuity and the feature-related data. The VAM module is further configured to compute feature-related data associated with a visual feature of the selected region.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1:
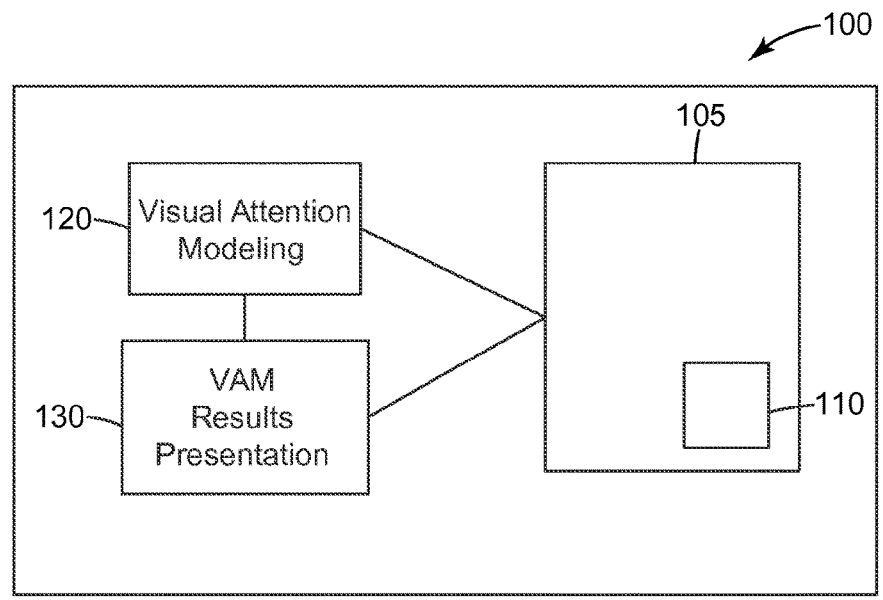
FIG. 1 illustrates an embodiment of a visual attention presentation system.

Typically, when a biological visual system receives a visual input, a retinal image representation is formed. Generally speaking, visual attention operates as a two-stage process. Early-stage visual processing is based on low-level, non-volitional features, also referred to as bottom-up features, such as color, contrast, luminance, motion, orientation, and the like. Later, volitional features, also referred to as top-down features, such as spatial biases, prior-knowledge, tasks, expectations, goals, will influence the early-stage visual processing. The biological visual system processes the information combining both the bottom up visual features and the top-down influences to allocate visual attention at a specific object or region in the visual input.

A visual attention model (VAM) simulates neurological processes and psychological effects in a biological visual system. Visual representation of a visual input, in a form consumable by a YAM, simulates a retinal image representation. In some cases, visual features may be simulated in a visual attention model. VAMs can predict how human observers will perceive a scene or video. This prediction can be particularly important to content developers who want to emphasize certain parts of a scene, such as a region where a product is shown or text appears. However, visual attention models are highly complex and rely on a wide variety of different visual features to model attention, and most content creators are not experts in human vision. To facilitate the improvement of content, there is a need to provide additional information from the visual attention model that informs the content creator about why a particular region or object within a scene (either static or dynamic) receives the visual attention, and what may be changed to alter the levels of visual attention received by the particular region or object. In some embodiments, impact of a visual feature for a specific region is used to facilitate the understanding of the VAM result and to provide information to a user to regarding how to change the scene to achieve the desired VAM result. For example, if an impact of edge of Region A is 80% while an impact of red-green contrast of Region A is 5%, a user should change the edge feature in order to change the visual attention allocated to Region A.

Visual features are features that may be represented in a visual attention model. For example, visual features include bottom-up features, which are the particulars of a visual input, such as color, edges, luminance, faces, intensity, font, orientation, motion, distance from fovea, contrast, text, spatial frequency, shape, size, or the like. As another example, visual features may include top-down, volitional effects, such as spatial biases, prior-knowledge influences, task-based influences, and the like. Impact, also referred to as contribution, of a visual feature describes how the visual feature affects the overall visual attention received by a specific region or the entire visual representation. For example, for an area of the image filled with an intense solid red color that has no strong edges, the impact of the red-green contrast feature may be high, but the impact of the edge feature may be low. Impact can be represented as, for example, percentage of visual conspicuity the region, percentage of the maximum possible contribution to overall attention by the visual feature, a normalized number, or the like.

Embodiments of the present disclosure are generally directed to systems and methods for computing and presenting the results of visual attention models. Some embodiments are directed to providing contribution of a feature to the overall level of visual attention received of a specific region, and this information can facilitate a user to understand why the visual attention is allocated and know how to change the visual input to achieve certain visual goal. Some embodiments are directed to providing feedback showing the potential impact of changes within a particular region on the overall level of attention received by the region.

Visual representation refers to images, videos, metadata of images, metadata of videos or inputs in other format that is consumable by a visual attention model. Examples of visual representations include a representation of a portion of a scene, such as what will be displayed on a billboard or packaging, an advertisement displaying on websites, or a representation of an entire scene, such as a skyline containing a billboard, an image of packaged goods on a shelf, a complete website including an advertisement, or a digital menu board together with its surrounding environment. A scene may refer to a digital scene that is generated by a computer or a group of computers, such as a webpage, a video game, and the like. The visual representation may be stored in any file format that allows for the extraction of features, including the standard file formats for still images and video.

Some visual attention models rely on a number of features to calculate the likely human visual attention received by different parts of a scene. These features may include, but are not limited to, for example, contrast, faces, edges, text, motion, spatial frequency, orientation, shape, or size. Contrast refers to the difference in luminance and/or color. Edges may be defined by sharp thresholds. Text may be identified through the quantity of edges, or by other known image processing algorithms. Human faces may be identified through face recognition algorithms, for example. Spatial frequency may be determined by applying a frequency-based coordinate system to the visual representation, such as that achieved in JPEG compression or by applying a Fourier transform to pixels encoding RGB (red-green-blue) values. Visual attention models may also incorporate other features that can be extracted from a visual representation, where the measured results correlate with human visual attention.

To better understand this disclosure, FIG. 1 illustrates an embodiment of a visual attention presentation system 100. In this system, a visual representation 105 is a representation of scene where a viewer can see. The scene can include natural environment, such as a retail store, an outdoor scene, or a building and the like, and/or a digital environment that is created by a computer or a group of computers, such as a webpage, a video game, and the like. A selected region 110 is a region and/or an object of interest that it is intended to be attended or not attended. For example, a selected region 110 can be a digital sign, a portion of a digital sign, a person, a vehicle, or the like. In the visual attention presentation system, visual attention modeling 120 (VAM) receives the visual representation 105 of the scene and predicts how viewers' attention is going to allocate within the scene and regarding the selected region 110, and such results are provided by the VAM results presentation 130.

In some embodiments, VAM 120 can extract feature maps from the visual representation 105, and then make calculations based on the feature maps and a mixing model to arrive at visual conspicuities indicative of how visual attention is allocated on the visual representation 105. VAM 120 can use various computational models for visual attention (sometimes called visual attention models, eye-gaze prediction models, attention models, or saliency models), for example, the visual attention model described by Itti, L. & Koch, C. (2000), *A saliency-based search mechanism for overt and covert shifts of visual attention*, Vision Research, vol. 40, pages 1489-1506, the visual attention model described by D. Gao, V. Mahadevan and N. Vasconcelos (2008), *On the plausibility of the discriminant center-surround hypothesis for visual saliency*, Journal of Vision, 8(7):13, 1-18, or the like. The results of VAM, or referred to as visual conspicuities, may be provided in the format of, for example, a map of the salience of different regions, the probability that a viewer will look at certain regions, the sequence with which a viewer is likely to move their attention through the image, and the like.

Figure 2:
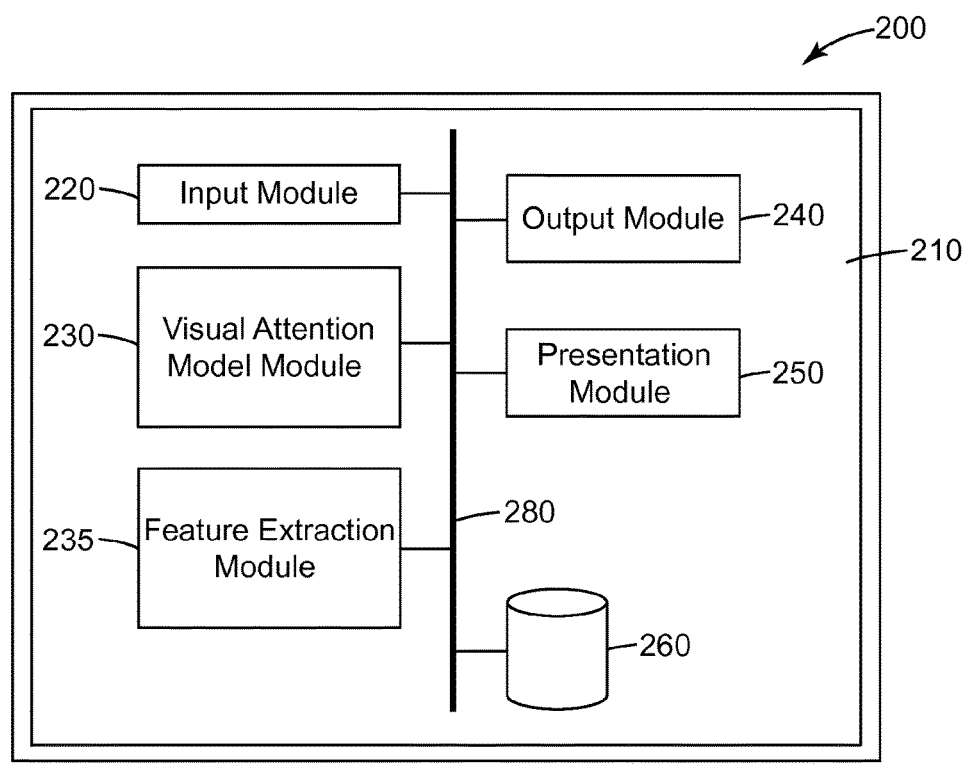
FIG. 2 is a functional module diagram of an exemplary visual attention presentation system.

FIG. 2 is a functional module diagram of an exemplary visual attention presentation system 200, which is a system for computing and presenting the results of visual attention models. Visual attention presentation system 200 is, in the embodiment shown in FIG. 2, within computer system 210. Computer system 210 may be any general purpose or application-specific computers, computing devices, and/or cloud-based computing devices. It may be a stand-alone computer, or a plurality of networked computers or devices. Further, computer system 210 may include, for instance, a handheld computer, digital camera, or a tablet PC, or even a cellular telephone. Computer system 210, in one embodiment, has various functional modules (not shown in FIG. 2) that comprise an operating system. Such an operating system facilitates the visual attention model improvement system's access to the computer system's resources. Computer system 210 may have one or more processors and memories, and various traditional input/output interfaces. In some embodiments, the system 200 can include an input module 220, a visual attention model module 230, an optional feature extraction module 235, an output module 240, an optional presentation module 250, a data repository 260, and a communication interface 280.

In one embodiment, the input module 220 may receive or generate a desired number of visual representations of a scene or a portion of a scene. For example, visual representation of at least a portion of an environment may be one or more photographs taken from the scene or a video recorded from the scene. As another example, visual representation can be a computer-generated image, a set of images, or video. In another embodiment, input module 220 may select a desired number of visual representations from a data repository storing visual representations of scenes. In one particular embodiment, input module 220 may select or generate visual representations of a scene or a portion of a scene that may differ on a visual feature. For example, input module 220 may select pictures of two store settings, where each store setting has a digital signage display and the display content in one store is different from the display content in another store.

Visual attention model (VAM) module 230 is any embodiment of any visual attention model or combination of models. VAM module 230 takes the input of a visual representation of at least a portion of an environment and generates a modeling output. Visual attention model module 230 is shown in FIG. 2 as part of visual attention presentation system 200, but VAM module 230 in another embodiment operates as a stand-alone computer process or even as a service provided over any type of computer network at a remote computer. In some embodiments, VAM module 230 can generate an overall attention score of a region (e.g., a probability score representing how likely this region will be attended to) using any visual attention model or combination of models. In a particular embodiment for determining impact for a selected region in a scene, the visual attention presentation system 200 can include a feature extraction module 235, which is configured to determine a feature score for a visual feature that is manually or automatically identified for every pixel in the original image or a resized image. Based on the feature scores, a feature score for the region can be determined. For example, intensity contrast feature of a region can be a simple summation of the RGB components for each pixel of the region, which may be scaled by the standard deviation of the summation. In this example, the feature score of the intensity contrast feature of the region can be determined as the local maximum of the intensity feature of the region.

Output module 240 is configured to determine a contribution of the visual feature to the visual conspicuity of the selected region based on the visual attention result and the feature score. In the example above, the output module 240 can determine a scale factor using the overall visual conspicuity of the region and the summation of the feature scores of all identified features, and then determine the contribution of intensity feature as the feature score for the intensity feature scaled by the scale factor.

In some embodiments, the visual attention presentation system 200 can include a presentation module 250 configured to generate a visual indicia indicating the contributions of one or more visual features. The visual indicia can be in the format of, for example, a table, a chart, a graph, a figure, a list of numbers, or the like, or a combination thereof. The visual indicia can be rendered on an electronically addressable display and/or included in a report. Various modules and components of the visual attention presentation system 200 can be implemented as software, hardware, firmware, or a combination thereof. In some cases, various components of the visual attention presentation system 200 can be implemented in software or firmware executed by one or more computing devices.

The data repository 260 may include any transitory and non-transitory computer readable medium to store information and data for the visual attention presentation system, including but not limited to, visual representation, feature maps, probability map, feature impacts, and visual conspicuity. The data repository 260 may include random access memory, a flat file, a XML file, or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository 260, for example, may be a single relational database such as SQL Server from Microsoft Corporation. In some cases, the data repository 260 may include a plurality of databases that can exchange and aggregate data by data integration process or software application. In an exemplary embodiment, part of the data repository 260 may be hosted in a cloud data center.

The communication interface 280 can provide electronic communication among the components of the visual attention presentation system 200. The communication interface 280 can include both short-range and long-range communication interfaces. The short-range communication interfaces may be, for example, local area network (LAN), interfaces conforming to a known communications standard, such as Bluetooth standard, IEEE 802 standards (e.g., IEEE 802.11), a ZigBee or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface 280 may be either within a private computer network, such as intranet, or on a public computer network, such as the internet.

Figure 3A:
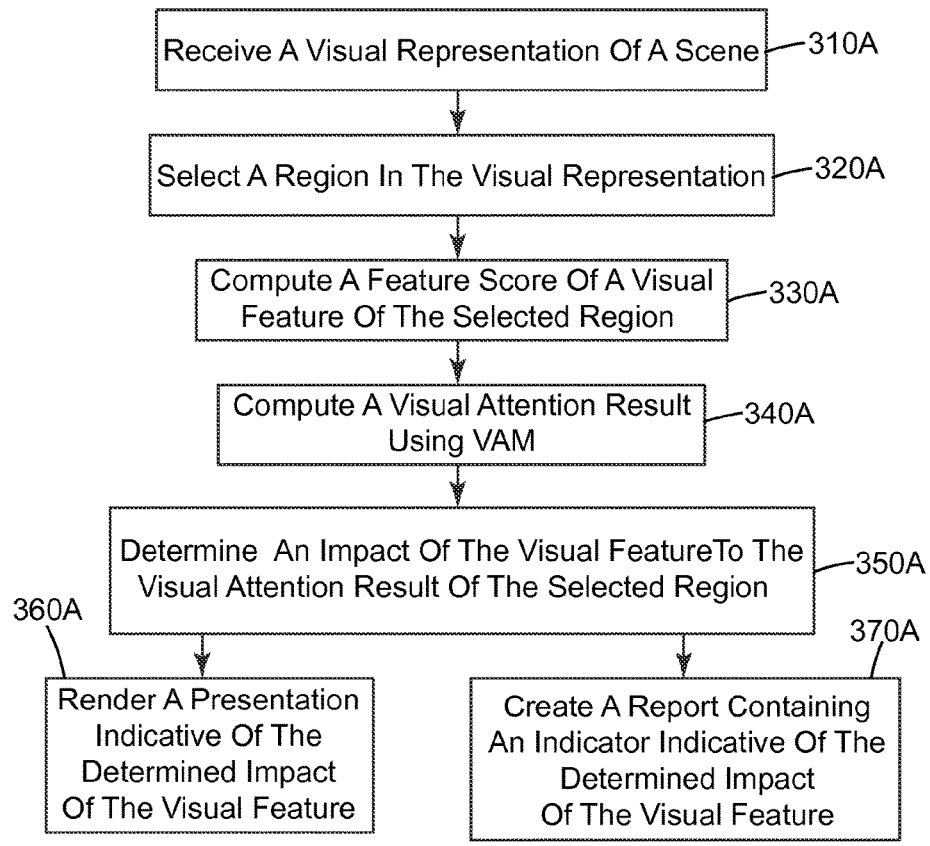
FIG. 3A illustrates a functional flow diagram of an exemplary embodiment of a visual attention presentation system.

FIG. 3A illustrates a functional flow diagram of an exemplary embodiment of a visual attention presentation system. Initially, a visual representation of scene is received (step 310A). The visual representation may be a file of any type that allows for the extraction of features and analysis by a visual attention model. The visual representation is stored in memory and may be presented to a viewer for manual selection of a region or made available to analysis tools used to make an algorithmic selection of a region of the visual representation.

A region of the visual representation is then selected (step 320A). The selection of the region of interest may be based on user input, or through algorithmic selection. The region of interest is the area within which the importance of various features or the impact of potential changes will be calculated and presented to a user.

In embodiments where users select the region of the visual representation, the step may include presenting the visual representation to the user, and receiving the selection through a feedback device including but not limited to a mouse, track-ball or touch screen. The user selection may be made through one or more of a variety of methods, for example, drawing a polygon, drawing of a closed region, tagging specific assets that are used in the visual representation. In embodiments where the visual representation is a video, the user may select a period of time, then for that period of time, select an area as described above.

In some embodiments, the region is selected algorithmically. The algorithmic selection may be made based on analysis by a visual attention model, for example, selecting the region with the highest level of attention paid to it, or region that is likely first to be viewed in the visual sequence predicted by the model. In some embodiments, the algorithmic selection may be based on recognizing particular features, such as text or faces, and selecting the regions containing those features. In some embodiments, distinct elements of the visual representation such as one or more layers of an image or video frame or other objects defined in the visual representation may be selected; this selection may additionally be determined by metadata or other tags describing the object within the visual representation. This selection creates a closed region for which feature scores may be calculated and provided to a user.

One or more feature scores are calculated within the selected region for each of the features relevant to the model (step 330A). These feature scores are calculated for each individual feature by, for example, finding the local maximum value of each particular feature and dividing it by a scaling factor which is determined by the overall score of the region. The local maximum for each feature is determined for each feature by searching that feature map within the selected region for the peak value of the feature. A scaling factor can be used to convert the feature score of a particular feature into a measure of contribution of that particular feature to the region's overall probability of being seen. The scale factor can be generated using linear equations or non-linear equations using the feature-related data and/or the visual conspicuities data. In an exemplary embodiment, the scaling factor is the maximum predicted probability of viewing within the selected region, divided by the sum of the maximums of each model feature within the selected region.

Further, a visual attention result of the selected region is computed by applying a visual attention model on the visual representation (step 340A). An impact of the visual feature to the visual attention result of the selected region is also determined based on the feature score and the visual attention result (step 350A). In some embodiments, the system renders a presentation indicative of the determined impact of the visual feature (step 360A). In some cases, the system may generate a report containing an indicator indicative of the determined impact of the visual feature (step 370A).

In some embodiments, the visual attention presentation system can extract feature values for each pixel in an image. The feature values can be represented as feature maps, as shown in 521-526 in FIG. 5B. The system can generate a probability heat map, or referred to as probability map, for example, by transforming a saliency map that is created by any suitable VAMs. As an example, the visual attention presentation system can then compute impacts of identified features for a specific region using the pseudocode listed in Table 1.

TABLE 1

Pseudocode for Computing Impact for each feature in the set of identified features
    featureScores[feature] = maximum value of feature in region
end for
overallScore = maximum value of probability heat map in region
impactScale = overallScore / (sum of featureScores)
for each feature in the set of attention model feature images
    featureImpacts[feature] = featureScores[feature] * impactScale
end for In one exemplary embodiment, where visual features are intensity, edges, faces, blue-yellow contrast and red-green contrast, the feature scores and impacts of visual features may be calculated using the pseudocode listed in Table 2.

TABLE 2

Pseudocode for computing Impact redGreenScore = average value of red minus green feature in region
blueYellowScore = average value of blue minus yellow feature in region
intensityScore = average value of intensity feature in region
edgeScore = average value of edge feature in region
faceScore = average value of face feature in region
overallScore = maximum value of saliency map in region
impactScale = overallScore / (redGreenScore + blueYellowScore +
                  intensityScore + edgeScore + faceScore)
redGreenImpact = redGreenScore * impactScale
blueYellowImpact = blueYellowScore * impactScale
intensityImpact = intensityScore * impactScale TABLE 2-continued Pseudocode for computing Impact edgeImpact = edgeScore * impactScale
faceImpact = faceScore * impactScale Feature scores can be output to users through a variety of different means. In some embodiments, the scores are provided to the user through displaying the scores on a screen. In some embodiments, the scores are presented alongside other aspects and results of the visual attention model, including, the feature maps and the overall heat map of probability of receiving attention, or the visual representation, sometimes with indicators of the selected region. In other embodiments, this data is output as a file that contains a report of the various feature scores, the selected region, and additionally may contain the feature maps, the salience map, the heatmap of probabilities of attention, and/or the likely visual sequence viewers follow when presented the visual representation.

Figure 3B:
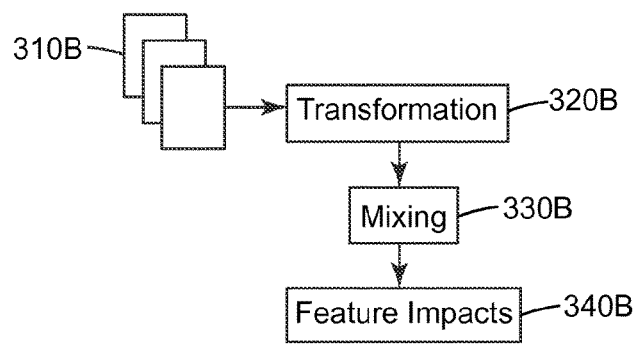
FIG. 3B illustrates a flow diagram of an embodiment for determining feature impacts.

In some embodiments, feature impacts (i.e. feature contributions) can be determined using the flow diagram illustrated in FIG. 3B. Transformation 320B and mixing 330B are applied to one or more feature maps 310B to estimate feature impacts 340B for one or more selected regions. Different computation approaches can be used for transformation and mixing. For example, the feature impacts can be estimated by feature scores multiplied by the corresponding feature weights (i.e., transformation step) and summed up (i.e. mixing step); and then dividing each feature score by this sum. In some embodiments, the mixing 330B can also use a complex computation model, such as a regression tree, regression neural network, or other prediction model. A feature impact can be further adjusted using a baseline obtained via setting the feature score to a predefined value. For example, the baseline can be computed by setting the feature score to be 0 (e.g., remove the face feature to set the face feature score to be 0). Feature impacts may be output to users in similar manners as the feature scores.

Figure 3C:
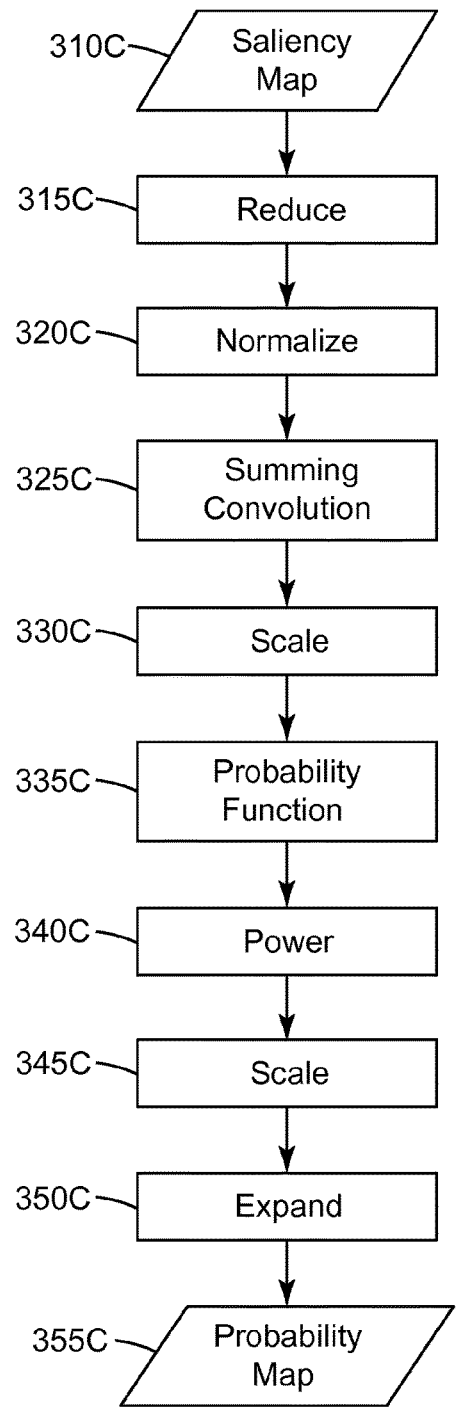
FIG. 3C illustrates a flow diagram of an embodiment for computing probability map.

FIG. 3C illustrates a flow diagram of an exemplary embodiment for computing probability map. Some of the steps in the flow diagram are optional, for example, step 340C. First, saliency map is provided as input to a system (step 310C). In some embodiments, the input and output of each step in the flow diagram can be a two-dimensional floating point image where each pixel is represented as a floating point number. Next, optionally, the saliency map is reduced down to a certain size (step 315C), for example, one quarter of the original map—half height and width. Scaling down has the same effect as blurring, and allows the calculation to be run on one quarter of the data. The system further normalizes the saliency map (step 320C) by, for example, calculating the sum of all pixels in the image, and dividing each pixel in the map by this value. Each pixel now represents its portion of the total saliency in the saliency map. The system calculates the summing convolution of the map (step 325C). For example, the output of the convolution for one of the pixels is the sum of the pixel values in a square area around it. The sum is repeated for every pixel in the map, using a square area of approximately 40×40 pixels in a quarter-sized map, which corresponds to an 80×80 pixel area for the original saliency map. In this example, 80×80 pixel size is selected to simulate the area of the fovea. Each pixel is multiplied by a constant value which relates saliency to probability of fixation (step 330C). Each pixel now represents the probability of focusing on it given the saliency of the surrounding area.

The value of each pixel is passed through a function which returns the probability of fixating (focusing the gaze) on that pixel at least once in a predetermined fixations (step 335C), for example, seven fixations. Seven is an estimate of the number of fixations that an individual will make in the first three to five seconds of viewing an image. For example, the function can be $1-(1-p)^7$, where p is the pixel value, 7 is the number of chances to fixate on the pixel, and 1 is the maximum value of a pixel in the image. The function may increase the value of each pixel, because in the span of viewing time, the pixel will have multiple "tries" or "chances" to attract a fixation. The maximum value of all of the pixels in the image is calculated and each pixel is raised to a constant power (step 340C). The maximum value of all of the pixels in the image is calculated again. The maximum value calculated in the previous step is divided by this value, and the resulting value is multiplied by every pixel in the image (step 345C). This has the effect of restoring the maximum value the image had before step 340C. The map is expanded back up to its original size (step 350C) to produce the probability map (step 355C), which is the output of the flow diagram.

Figure 4:
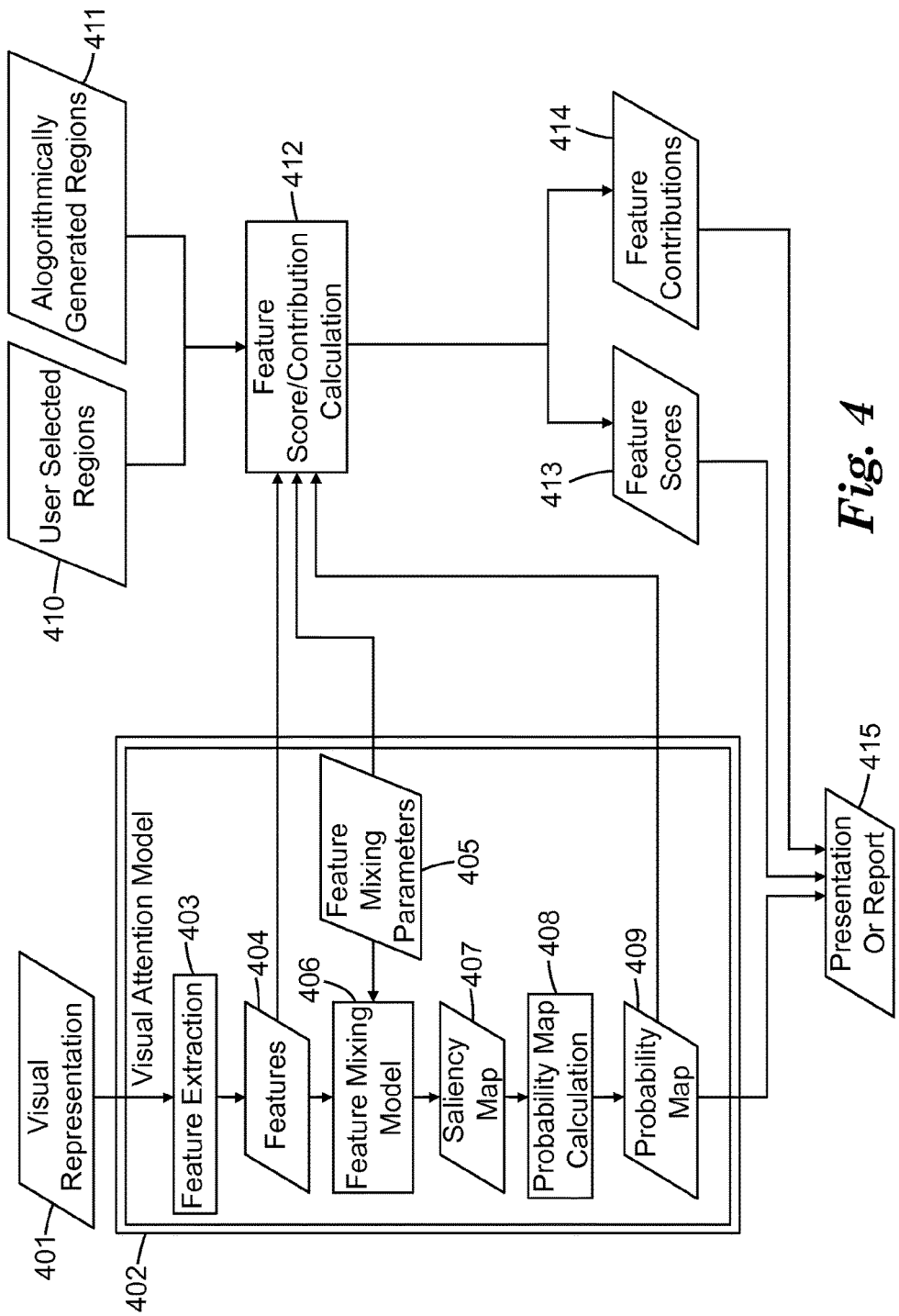
FIG. 4 shows a data flow diagram of an embodiment for determining the feature scores of a particular region of a visual representation.

FIG. 4 shows a data flow diagram of an embodiment for determining the feature scores of a particular region of a visual representation. A visual representation 400 is provided to a visual attention presentation system. The visual representation 400 can be a still image, a set of images, a sequence of images, a video, or the like. If the visual representation 400 is not a single image, the visual representation can be analyzed, for example, by applying VAM to each of the images in the visual representation respectively and merging the list of VAM results using summary statistics. That visual representation 400 is analyzed by the visual attention model 402. The first step in the visual attention model analysis is feature extraction 403.

The extracted features 404 are both provided to the feature mixing model 405 within the visual attention model 402, and provided to the feature score/contribution calculation 412 to compute the feature scores 413. The feature mixing model 405 combines the extracted features to generate a saliency map 407, using the feature mixing parameters 406, for example, one or more weighting factors, or parameters of a more complex model, such as a regression tree, regression neural network, or other prediction model either hand tuned or learned by a machine learning algorithm. The saliency map 407 is transformed by the probability map calculation 408 to convert the salience scores into probabilities that certain regions draw attention. That probability is presented as a probability map 409 which may be presented to the user as part of the presentation and/or report 415. The features 404 extracted from the visual representation 401 and selected regions of interest, user defined 410 and/or algorithmically generated 411, are used to compute the features scores 413. In some cases, the feature score/contribution calculation 412 uses the features 404 and the heat map 409 to determine the scaling factor and the local maximums of each of the features 404 within the selected regions of interest 410 and 411 to determine the feature scores 413. The system may then determine the feature contributions 414 using both the feature scores 413 and the heat map 409. The feature contributions 414, the feature scores 413, and/or the heat map 409 can then be used to generate a presentation and/or report 415.

Figure 5A:
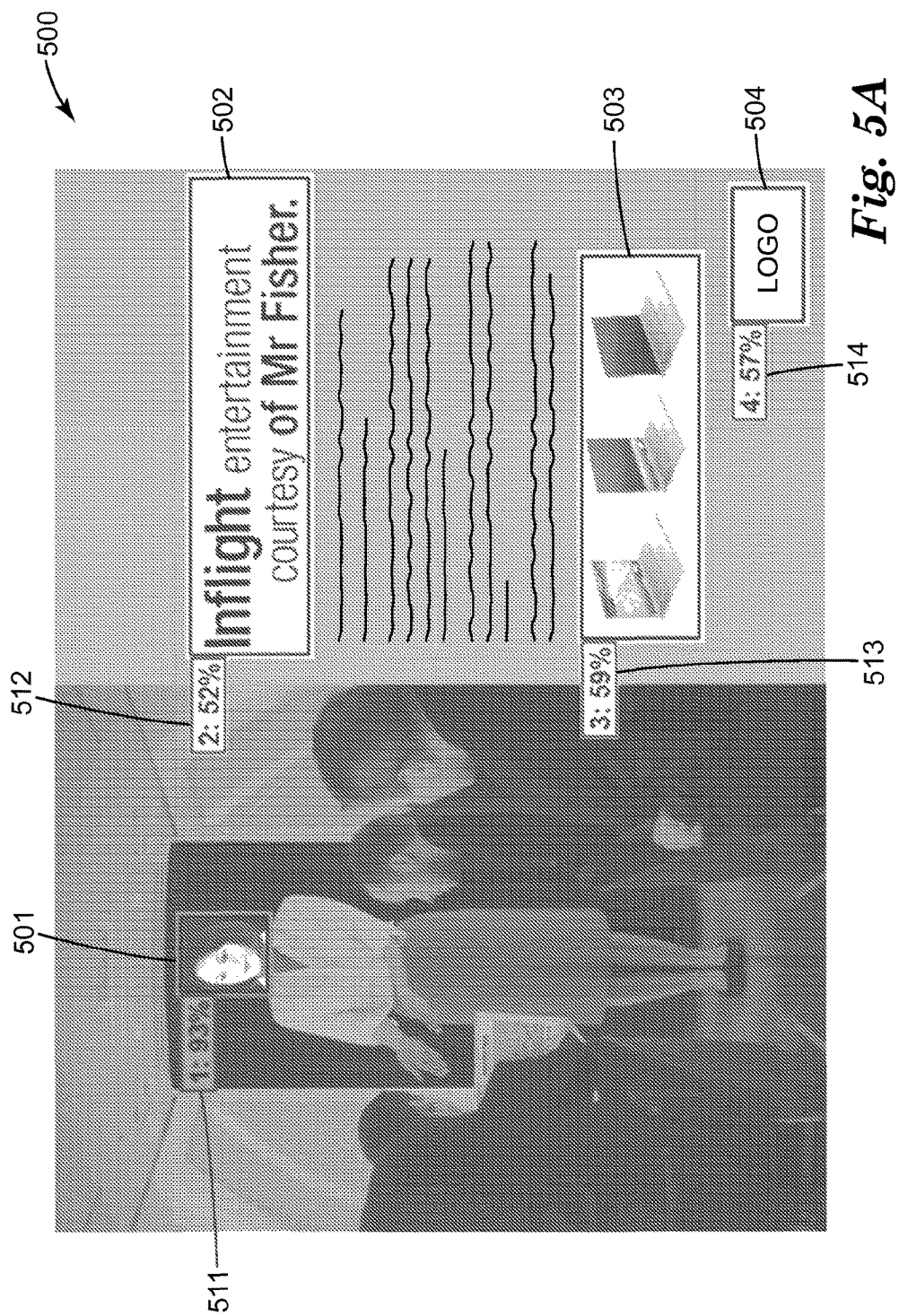
FIG. 5A illustrates an example of visual representation.
Figure 5B:
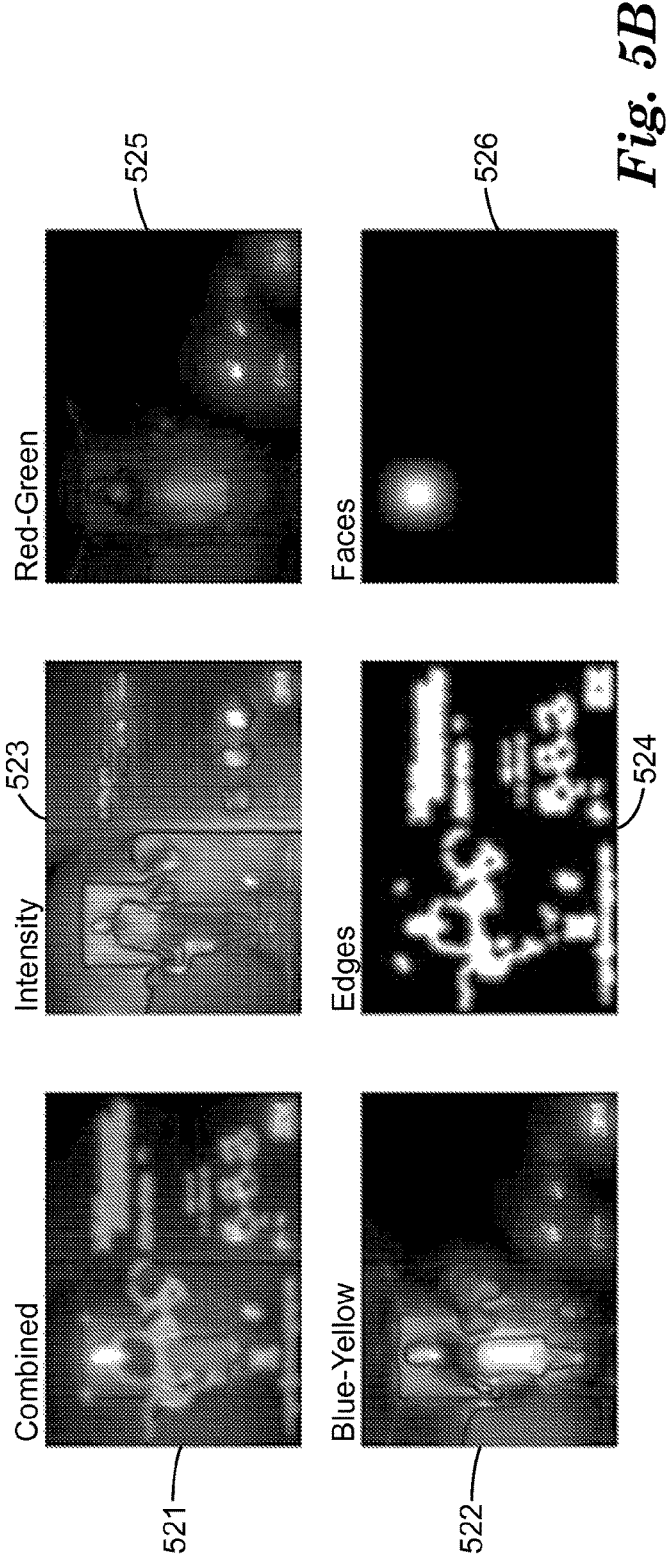
FIG. 5B illustrates an example of visual indicia indicative of impact and other conspicuity related data.

FIG. 5A illustrates an example of visual representation 500 (a colored image illustrated in gray-scale) of a digital scene (i.e., a piece of content to be presented on a display device) and an illustrative result of VAM. Selected regions 501-504, either by manual selection or by algorithmic selection, are provided to a visual attention presentation system. The system applies a visual attention model to the visual representation 500 and generates indicatives for visual conspicuities, for example, as illustrated as 511-514. As an example, region 501 is a face and 93% of viewers are likely attended to this region indicative a VAM result. The system also computes and outputs the feature maps along with feature scores and feature impacts, collectively as visual indicia, as shown in FIG. 5B. As an example, 522 is a blue-yellow contrast feature map, 523 is an intensity feature map, 524 is an edge feature map, 525 is a red-green feature map, 526 is a face feature map, and 521 is a heat map combining and mixing all these features, where the heat map is usually a colored map with the color of each pixel representing the visual conspicuity, for example. The feature scores and feature impacts of the selected regions 501-504 are listed in table 530 (i.e., the second column lists the data of feature scores and feature impacts for region 501). With such information, user can make targeted changes to achieve desired visual attention result. For example, if the user would like to change the attention allocation for region 504, the user is more likely to vary the attention allocation by changing blue-yellow contrast than by changing intensity contrast.

The present invention should not be considered limited to the particular examples and embodiments described above, as such embodiments are described in detail to facilitate explanation of various aspects of the invention. Rather the present invention should be understood to cover all aspects of the invention, including various modifications, equivalent processes, and alternative devices falling within the spirit and scope of the invention as defined by the appended claims and their equivalents.

What is claimed is:

1. A method for assessing the impact of visual features within a region of a scene with a computer having a processor and memory, comprising:
   receiving a visual representation of a scene;
   receiving region selection data indicative of at least one selected region within the scene;
   applying, using the processor, a visual attention model to the visual representation to determine visual conspicuity of the at least one selected region;
   computing, using the processor, feature-related data associated with a plurality of visual features associated with the at least one selected region, wherein a feature comprises at least one of color, edges, luminance, faces, intensity, font, orientation, motion, contrast, text, spatial frequency, shape and size;
   based on the visual conspicuity and the feature-related data, determining a feature impact score that at least one of the visual features within the at least one selected region have on the visual conspicuity.

2. The method of claim 1, further comprising:
   rendering, by the processor, a visual indicia indicative of the feature impact score.

3. The method of claim 2, wherein the visual indicia comprises at least one of a color, a number, and a letter.

4. The method of claim 2, further comprising:
   creating, by the processor, a report containing the visual indicia.

5. The method of claim 1, wherein the contrast is red-green contrast or blue-yellow contrast.

6. The method of claim 1, wherein the region selection data is based upon a user input.

7. The method of claim 1, wherein the region selection data is based upon an algorithmic selection by the computer.

8. The method of claim 1, wherein the visual representation comprises an image, a video, metadata of an image, or metadata of a video.

9. The method of claim 1, wherein the feature impact score is represented by a numeric value.

10. The method of claim 1, wherein the feature impact score is represented by a percentage.

11. The method of claim 1, wherein the visual conspicuity is represented by a numeric value, an image, a percentage, or a combination thereof.

12. A system for presenting visual attention model (VAM) results comprising:
   an input module configured to receive a visual representation of a scene and region selection data indicative of a selected region within the scene,
   a VAM module configured to apply a visual attention model on the visual representation to determine visual conspicuity of the selected region, the VAM module further configured to compute feature-related data associated with a visual feature of the selected region, wherein a feature comprises at least one of color, edges, luminance, faces, intensity, font, orientation, motion, contrast, text, spatial frequency, shape and size; and
   an output module configured to determine a contribution of the visual feature to the visual conspicuity of the selected region based on the visual conspicuity and the feature-related data.

13. The system of claim 12, further comprising:
   a presentation module configured to generate a visual indicia indicative the contribution of the visual feature.

14. The system of claim 13, wherein the visual indicia comprises at least one of a color, a number, and a letter.

15. The system of claim 13, further comprising:
   creating, by a processing unit, a report containing the visual indicia.

16. The system of claim 12, wherein the contrast is red-green contrast or blue-yellow contrast.

17. The system of claim 12, wherein the region selection data is based upon a user input.

18. The system of claim 12, wherein the region selection data is based upon an algorithmic selection by a computing device.

19. The system of claim 12, wherein the visual representation comprises an image, a video, metadata of an image, or metadata of a video.

20. The system of claim 12, wherein the contribution of the visual feature is represented by a numeric value.

21. The system of claim 12, wherein the contribution of the visual feature is represented by a percentage.

22. The system of claim 12, wherein the visual conspicuity is represented by a numeric value, an image, a percentage, or a combination thereof.

* * * * *

UNITED STATES PATENT AND TRADEMARK OFFICE
CERTIFICATE OF CORRECTION

| | |
|---|---|
| PATENT NO. | : 10,176,396 B2 |
| APPLICATION NO. | : 14/896701 |
| DATED | : January 8, 2019 |
| INVENTOR(S) | : William Smyth |

Page 1 of 1

It is certified that error appears in the above-identified patent and that said Letters Patent is hereby corrected as shown below:

In the Specification

<u>Column 2</u>
Line 38, delete "YAM," and insert -- VAM, --

Signed and Sealed this
Thirtieth Day of July, 2019

Andrei Iancu
*Director of the United States Patent and Trademark Office*